(12) United States Patent
Umebayashi et al.

(10) Patent No.: US 9,082,437 B2
(45) Date of Patent: Jul. 14, 2015

(54) HEAD SUSPENSION WITH DAMPING

(75) Inventors: Akira Umebayashi, Aikoh-gun (JP); Hiroshi Kawamata, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 21 days.

(21) Appl. No.: 13/494,394

(22) Filed: Jun. 12, 2012

(65) Prior Publication Data
US 2012/0251754 A1 Oct. 4, 2012

Related U.S. Application Data

(62) Division of application No. 12/456,361, filed on Jun. 16, 2009, now Pat. No. 8,225,485.

(30) Foreign Application Priority Data

Jul. 9, 2008 (JP) ................................. 2008-179478

(51) Int. Cl.
| | |
|---|---|
| G11B 5/48 | (2006.01) |
| G11B 21/16 | (2006.01) |
| G11B 33/08 | (2006.01) |
| G11B 33/14 | (2006.01) |

(52) U.S. Cl.
CPC ............ *G11B 5/4833* (2013.01); *G11B 5/4826* (2013.01); *G11B 33/08* (2013.01); *Y10T 29/4903* (2015.01); *Y10T 29/49021* (2015.01); *Y10T 29/49025* (2015.01); *Y10T 29/49027* (2015.01); *Y10T 29/49032* (2015.01); *Y10T 29/49826* (2015.01); *Y10T 428/14* (2015.01)

(58) Field of Classification Search
CPC .. G11B 5/4833; G11B 5/4826; G11B 5/5582; G11B 33/08; G11B 5/484

USPC .............. 360/244.2, 244.3, 265.9, 266, 97.19
See application file for complete search history.

(56) References Cited

U.S. PATENT DOCUMENTS

| | | | | |
|---|---|---|---|---|
| 4,774,610 | A * | 9/1988 | Kinjo ......................... | 360/244.2 |
| 5,572,387 | A * | 11/1996 | Brooks et al. .............. | 360/244.3 |
| 5,862,010 | A * | 1/1999 | Simmons et al. .......... | 360/99.15 |
| 5,875,072 | A * | 2/1999 | Brooks et al. .............. | 360/244.3 |
| 6,052,258 | A * | 4/2000 | Albrecht et al. ........... | 360/245.2 |
| 6,594,114 | B1 * | 7/2003 | Suzuki et al. .............. | 360/244.3 |
| 6,958,890 | B1 * | 10/2005 | Lin et al. .................... | 360/244.6 |
| 2001/0027929 | A1 | 10/2001 | Suzuki et al. | |

(Continued)

FOREIGN PATENT DOCUMENTS

| | | |
|---|---|---|
| CN | 1323721 | 11/2001 |
| JP | 2000-339895 | 12/2000 |

(Continued)

*Primary Examiner* — Adam B Dravininkas
(74) *Attorney, Agent, or Firm* — Jordan and Hamburg LLP

(57) ABSTRACT

A method of manufacturing a head suspension includes a punching process, a positioning process, and an affixing process. An objective part on the head suspension to which a damper 73 is affixed includes a discontinuous section 72. The punching process punches a damper material into the damper 73 whose shape corresponds to the shape of the objective part excluding the discontinuous section 72. The positioning process positions the damper 73 to the objective part so that the damper 73 avoids and surrounds the discontinuous section 72, and the affixing process affixes the damper 73 to the objective part. The method secures a uniform damping effect among manufactured head suspensions and improves the yield of dampers and head suspensions without deteriorating the functions and performances of the head suspensions.

4 Claims, 17 Drawing Sheets

Embodiment 2-1

Front view
(After affixing damper)

(56) References Cited

U.S. PATENT DOCUMENTS

| | | |
|---|---|---|
| 2006/0048367 A1 | 3/2006 | Ishihama et al. |
| 2007/0019331 A1* | 1/2007 | Kido et al. .................. 360/244.3 |
| 2008/0151433 A1* | 6/2008 | Soga et al. .................... 360/254 |
| 2008/0158725 A1* | 7/2008 | Hirano et al. ................... 360/86 |
| 2009/0183359 A1 | 7/2009 | Tsutsumi et al. |

FOREIGN PATENT DOCUMENTS

| | | |
|---|---|---|
| JP | 2001-028174 | 1/2001 |
| JP | 2001-067635 | 3/2001 |
| JP | 2008-204505 | 9/2008 |
| JP | 2008204505 A * | 9/2008 |

* cited by examiner

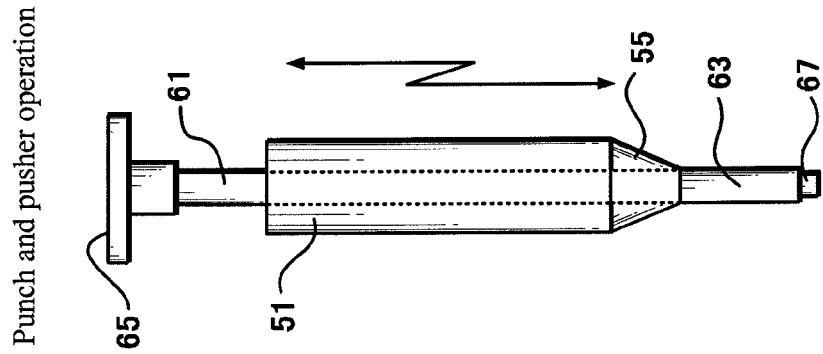
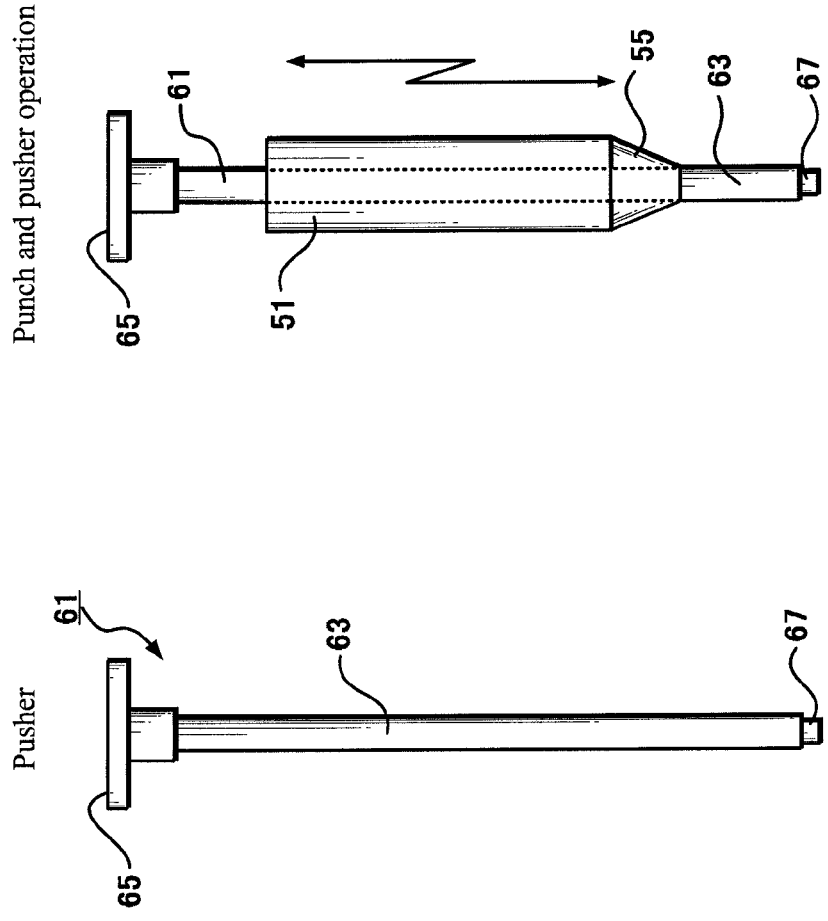
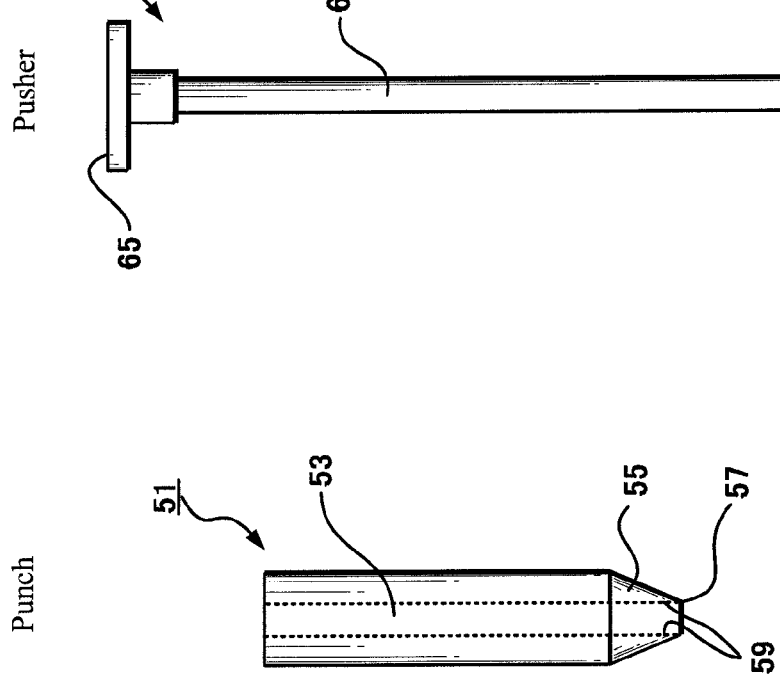

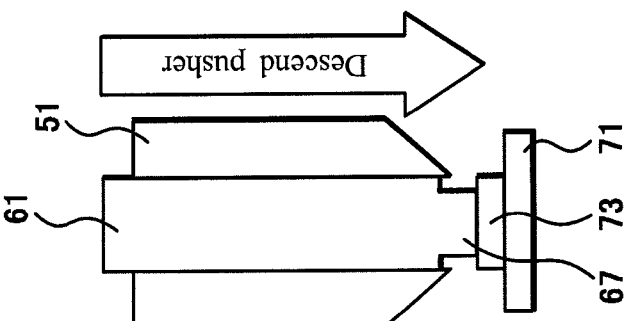
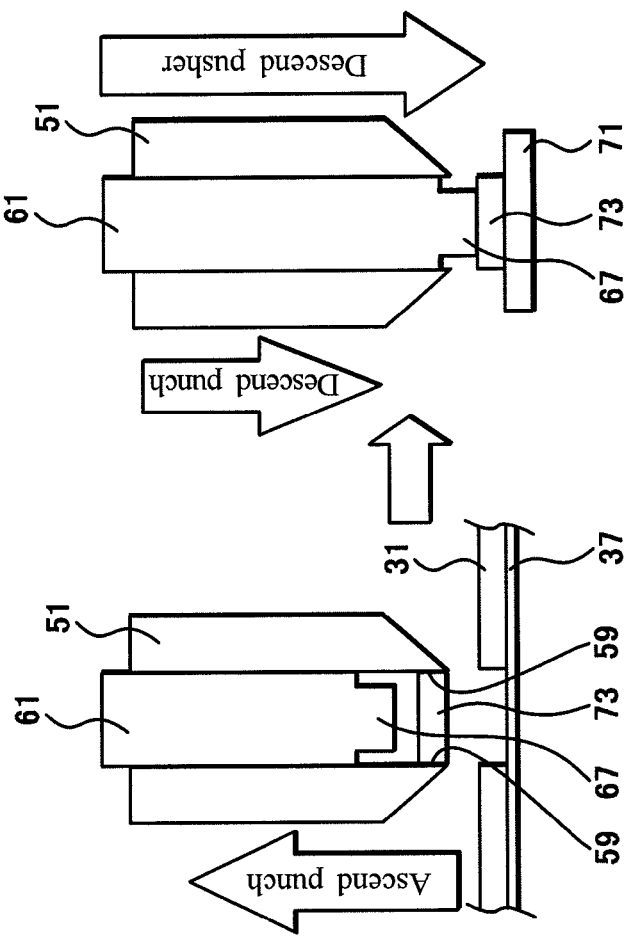
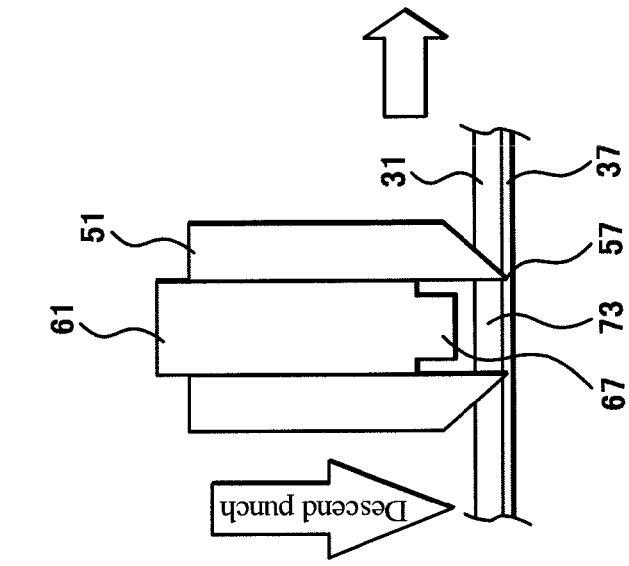

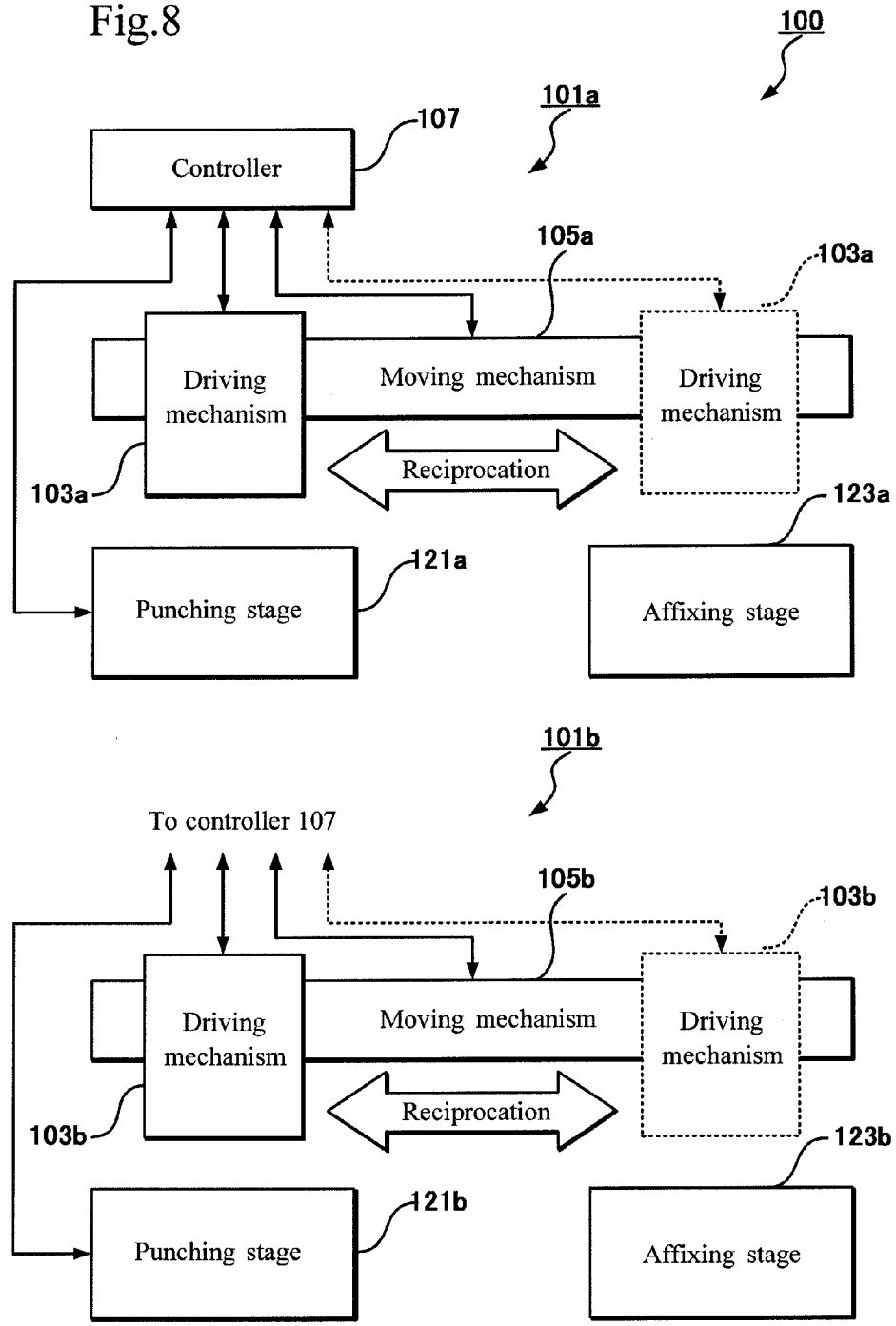

Embodiment 1

Embodiment 1

Front view
(Before affixing damper)

Front view
(After affixing damper)

Left side view
(After affixing damper)

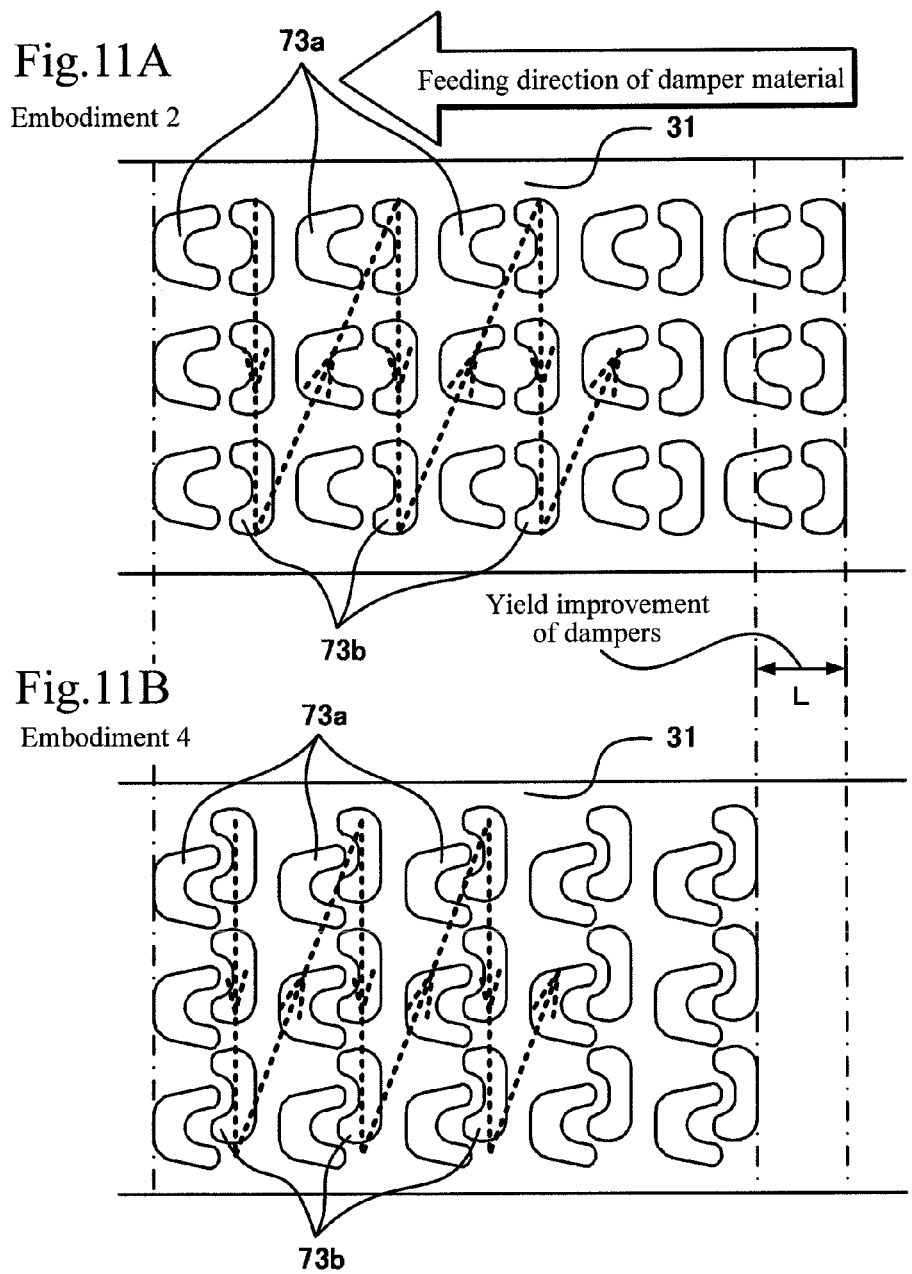

Embodiment 2-1
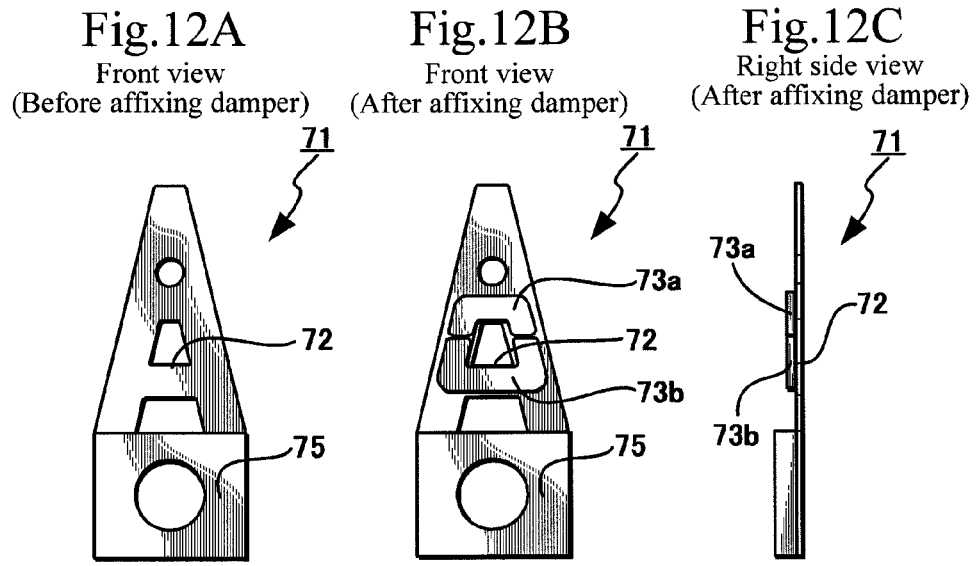
Fig.12A
Front view
(Before affixing damper)
Fig.12B
Front view
(After affixing damper)
Fig.12C
Right side view
(After affixing damper)
Embodiment 2-2
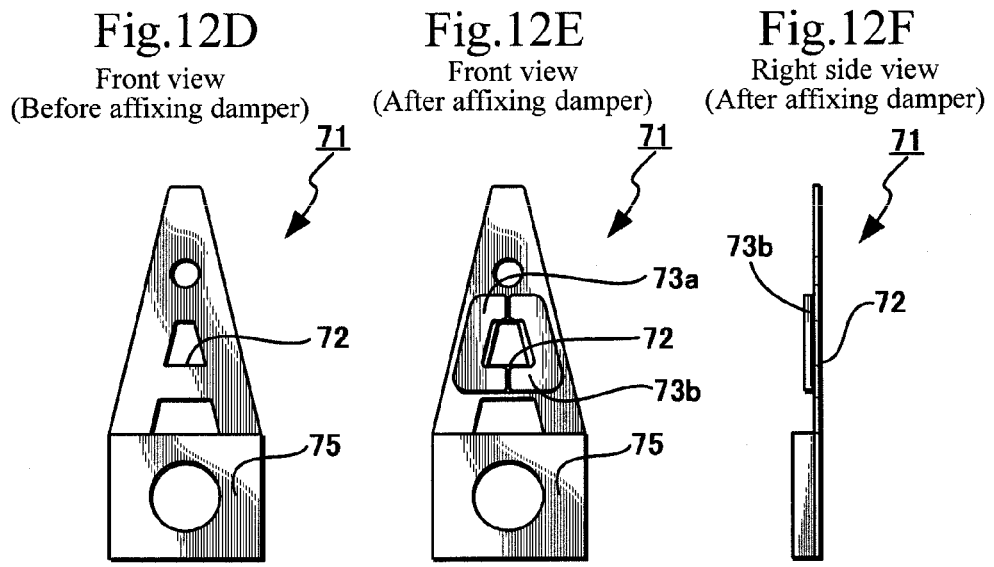
Fig.12D
Front view
(Before affixing damper)
Fig.12E
Front view
(After affixing damper)
Fig.12F
Right side view
(After affixing damper)

First damper material 31a according to Embodiment 2

Second damper material 31b according to Embodiment 2

Embodiment 2-1-1

Front view
(Before affixing damper)

Front view
(After affixing damper)

Right side view
(After affixing damper)

Embodiment 2-1-2

Right side view
(After affixing damper)

Embodiment 2-1-3

Right side view
(After affixing damper)

Embodiment 3-1

Front view
(Before affixing damper)

Front view
(After affixing damper)

Right side view
(After affixing damper)

Embodiment 3-2

Right side view
(After affixing damper)

Embodiment 3-3

Right side view
(After affixing damper)

Embodiment 5

Front view
(Before affixing damper)

Front view
(After affixing damper)

Right side view
(After affixing damper)

Problem of related art

Front view
(Before affixing damper)

Front view
(After affixing damper)

Right side view
(After affixing damper)

Enlarged right side view
(After affixing damper)

Dust adhering to adhesive face

HEAD SUSPENSION WITH DAMPING

REFERENCE TO RELATED APPLICATION

This is a divisional application of Ser. No. 12/456,361, filed Jun. 16, 2009 which is currently allowed. The subject matter of the aforementioned prior applications is hereby incorporated herein by reference.

BACKGROUND OF THE INVENTION

1. Field of the Invention

The present invention relates to a head suspension for supporting a magnetic head slider in a magnetic disc drive. In particular, the present invention relates to a method of manufacturing a head suspension, an apparatus for manufacturing a head suspension, and a head suspension, capable of uniformizing a vibration damping effect among head suspensions and improving the productivity of head suspensions.

2. Description of Related Art

A magnetic disk drive such as a hard disk drive (HDD) has a head suspension for supporting a magnetic head slider (hereinafter referred to as "slider"). The head suspension has a base plate, a load beam attached to the base plate, and a flexure attached to the load beam.

The head suspension is affected by turbulence (air vibration) and characteristic vibration to cause an off-track error and a data read/write error.

To suppress the vibration of the head suspension, there is a vibration damping technique that affixes a damper, which consists of a viscoelastic layer and a retaining layer, to the head suspension. This technique is disclosed in, for example, Japanese Unexamined Patent Application Publications No. 2001-067635, No. 2001-028174, and 2000-339895.

According to a related art, the viscoelastic layer of the damper is interposed between a head suspension and the retaining layer. When the head suspension vibrates and deforms, the viscoelastic layer deforms accordingly, to create frictional motion among viscoelastic molecules. This frictional motion converts vibration energy into thermal energy, to thereby reduce the vibration of the head suspension.

The damper is produced from a damper material that is made of a retaining layer, a viscoelastic layer, and a separator sheet attached to the viscoelastic layer. The damper material is punched into the damper having a required shape. The dampers thus formed are aligned on a liner and a worker picks up each damper on the liner with tweezers and affixes it to an objective part on a head suspension.

Such a manual operation in manufacturing head suspensions varies a vibration damping effect from one head suspension to another and deteriorates the productivity of head suspensions.

SUMMARY OF THE INVENTION

An object of the present invention is to provide a method of manufacturing a head suspension, an apparatus for manufacturing a head suspension, and a head suspension, capable of uniformizing a vibration damping effect among head suspensions and improving the productivity of head suspensions.

In order to accomplish the object, an aspect of the present invention provides a method of manufacturing a head suspension. The method includes punching a damper material that has an adhesive face covered with a removable liner with an edge of a hollow punch, thereby forming a damper having a one-stroke shape out of the damper material, the damper being held by an inner face of the hollow punch; positioning the punch with the damper held therein relative to an objective part defined on a surface of the head suspension; and pushing the damper with a pusher out of the punch to the objective part, so that the adhesive face of the damper is affixed to the objective part. The objective part includes a discontinuous section that is present on the surface of the head suspension and has a closed planar shape. Punching a damper material cuts out the damper so that the shape of the damper corresponds to the shape of the objective part excluding the discontinuous section. Positioning the punch positions the punch relative to the objective part so that the damper surrounds the discontinuous section and pushing the damper affixes the damper to the objective part so that the damper surrounds the discontinuous section.

Compared with the related art that temporarily arranges punched dampers on a liner, manually picks up each damper from the liner, and affixes the damper to an objective part on a head suspension, the method of the above-mentioned aspect simplifies the handling of dampers.

As a result, the method of the aspect improves an accuracy of positioning a damper on a head suspension, prevents dampers from dispersing or being lost, and increases the productivity of dampers and head suspensions.

BRIEF DESCRIPTION OF THE DRAWINGS

FIGS. 3A to 3B illustrate a punch and a pusher used to form a damper and affix the damper to a head suspension and FIG. 3C illustrates operation of the assembled punch and pusher;

FIGS. 5A to 5C sequentially illustrate a method of manufacturing a head suspension according to an embodiment of the present invention;

FIG. 8 is a block diagram illustrating an apparatus for manufacturing a head suspension according to an embodiment of the present invention;

FIG. 11A illustrates punching a damper material into damper segments according to Embodiment 2 of the present invention;

FIG. 11B illustrates punching a damper material into damper segments according to Embodiment 4 of the present invention;

FIGS. 12A to 12C illustrate a head suspension before and after affixing damper segments thereto according to Embodiment 2-1 of the present invention;

FIGS. 12D to 12F illustrate a head suspension before and after affixing damper segments thereto according to Embodiment 2-2 of the present invention;

DETAILED DESCRIPTION OF EMBODIMENTS

Methods of manufacturing head suspensions, apparatuses for manufacturing head suspensions, and head suspensions according to embodiments of the present invention will be explained in detail with reference to the drawings.

First, an apparatus and jigs for manufacturing a head suspension that are employable by the present invention will be explained.

Figure 1:
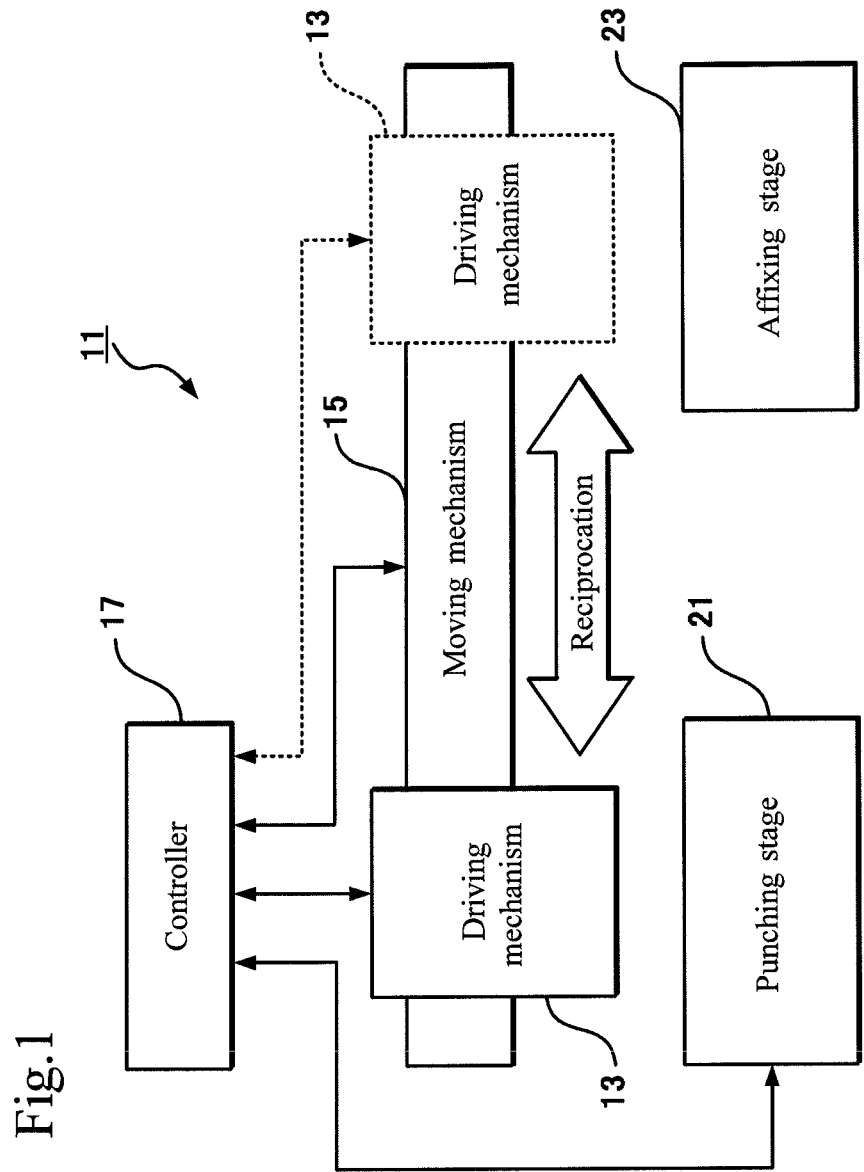
FIG. 1 is a block diagram illustrating an apparatus for manufacturing a head suspension.
Figure 2:
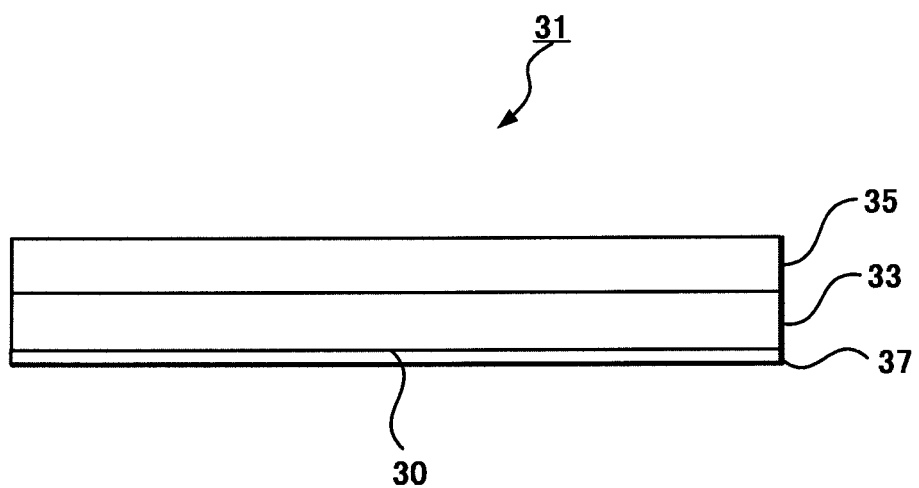
FIG. 2 is a side view illustrating a damper material from which a damper to be attached to a head suspension is formed.
Figure 4:
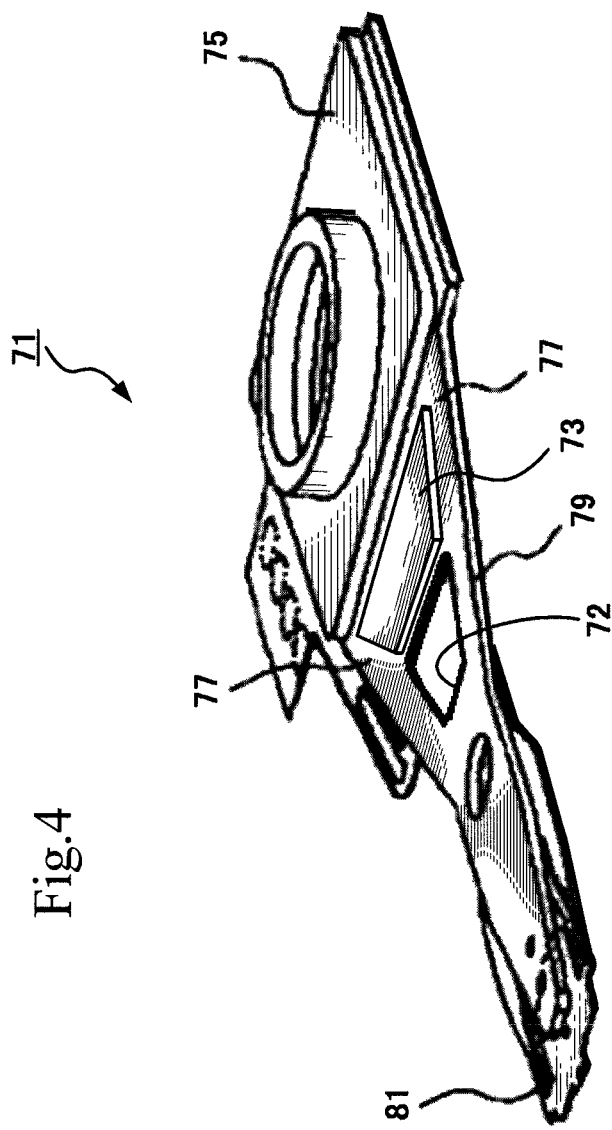
FIG. 4 is a perspective view illustrating a head suspension.

FIG. 1 is a block diagram illustrating an apparatus for manufacturing a head suspension, FIG. 2 is a side view illustrating a damper material from which a damper to be attached to a head suspension is cut out, FIGS. 3A to 3B illustrate a punch and a pusher used to form a damper and affix the damper to a head suspension, and FIG. 4 is a perspective view illustrating a head suspension.

The apparatus 11 (FIG. 1) for manufacturing a head suspension affixes a damper 73 (FIG. 4) to an objective part on a half-finished product of a head suspension 71 (FIG. 4), thereby finishing the head suspension 71.

An objective part to which the damper 73 is affixed may be on a half-finished head suspension that becomes a final product once the damper 73 is affixed thereto. The objective part may be on a load beam 79 (FIG. 4) that is used to complete a head suspension.

The apparatus 11 includes a hollow punch 51 (FIG. 3A), a pusher 61 (FIG. 3B), a driving mechanism 13 (FIG. 1) for driving the punch 51 and pusher 61, a controller 17, a punching stage 21, and an affixing stage 23.

The punch 51 has an edge 57 to punch a damper material 31 (FIG. 2) having an adhesive face 30 into the damper 73 (FIG. 4) having a predetermined shape. The punched damper 73 is held by an inner face 59 of the punch 51.

The driving mechanism 13 drives the punch 51 back and forth in a punching direction. The driving mechanism 13 also drives the pusher 61 back and forth in a pushing direction.

The moving mechanism 15 moves the punch 51 whose inner face 59 is holding the damper 73 to an objective part on the head suspension 71.

The pusher 61 is movably inserted into the hollow of the punch 51, to push the damper 73 out of the punch 51 and affix the adhesive face 30 of the damper 73 to the objective part on the head suspension 71.

The controller 17 is connected to the driving mechanism 13, moving mechanism 15, and the like and controls them.

The punching stage 21 is used to punch dampers and the affixing stage 23 is used to affix the dampers to head suspensions.

The controller 17 controls the driving mechanism 13 so that the punch 51 punches the damper material 31 into the damper 73, the moving mechanism 15 so that the driving mechanism 13 is moved and positioned to the objective part on the head suspension 71, and the driving mechanism 13 so that the pusher 61 pushes the damper 73 out of the punch 51 and affixes the damper 73 to the objective part on the head suspension 71.

As illustrated in FIG. 2, the damper material 31 consists of a viscoelastic layer 33 made of an adhesive and a retaining layer 35 laid over the viscoelastic layer 33. The viscoelastic layer 33 has the adhesive face 30 that is temporarily covered with a liner (separator) 37 to keep the adhesiveness of the adhesive face 30. When using the damper material 31, the liner 37 is removed from the adhesive face 30, so that, when the damper 73 is attached to the objective part on the head suspension 71, the adhesive face 30 is adhered to the objective part.

The viscoelastic layer 33 may be made of proper material, such as acryl-based adhesive having vibration damping and heat resisting characteristics. The thickness of the viscoelastic layer 33 is not particularly limited and may be in the range of, for example, 15 to 250 μm. If the thickness is less than 15 μm, the layer 33 will provide an insufficient damping effect, and if thicker than 250 μm, the layer 33 will hinder the resiliency of a head suspension.

The material of the retaining layer 35 is not particularly limited and is, for example, a metal plate or a plastic film. The higher the elasticity modulus of the material the better the vibration damping effect of the material, and therefore, the material may have an elasticity modulus of 2.943 $GN/m^2$ or higher according to JISK7127. Metal plates adoptable for the retaining layer 35 include a stainless steel plate, an aluminum plate, a copper plate, a phosphor bronze plate, and a beryllium copper plate. Plastic films adoptable for the retaining layer 35 include films made of polyimide resin, biaxial oriented polyethylene terephthalate (PET), biaxial oriented polypropylene, aramid resin, and polyethylene naphthalate.

The thickness of the retaining layer 35 is not particularly limited. When a metal plate is used as the retaining layer 35, the thickness thereof may be in the range of 10 to 150 μm, and when a plastic film is used, the thickness thereof may be in the range of 20 to 200 μm. If a metal plate thinner than 10 μm or a plastic film thinner than 20 μm is used, the retaining layer 35 will provide an insufficient retaining function. If a metal plate thicker than 150 μm or a plastic film thicker than 200 μm is used, the retaining layer 35 will hinder the resiliency of a head suspension.

The liner (separator) 37 laid over the viscoelastic layer 33 is not particularly limited. The liner 37 must properly be removed from the layer 33, and therefore, the surface of the liner 37 attached to the layer 33 may be processed with a silicon-based separator.

As illustrated in FIGS. 3A to 3C, the driving mechanism 13 has the punch 51 and pusher 61 that are jigs used to manufacture head suspensions according to the present invention.

The punch 51 is made of, for example, metal such as stainless steel and is chamfered to provide a trapezoidal appearance. The punch 51 has a hollow 53 that is also chamfered to provide a trapezoidal shape. A front end 55 of the punch 51 has the edge 57 to punch the damper material 31 and is provided with an inner face 59 that is polished and smoothed to smoothly punch the damper material 31 into the damper 73 and smoothly push the damper 73 out of the punch 51.

The pusher 61 is made of metal such as stainless steel and has a shaft 63 as illustrated in FIG. 3B. The shaft 63 is chamfered to provide a trapezoidal appearance corresponding to the hollow 53 of the punch 51. An end of the shaft 63 of the pusher 61 is provided with a disk-like fitting part 65 and the other end of the shaft 63 is provided with a narrowed part 67. The narrowed part 67 secures a space with respect to the inner face 59 of the punch 51 to prevent, when the pusher 61 pushes the damper 73 held by the inner face 59 of the punch 51, the viscoelastic layer 33 of the damper 73 from being caught between the inner face 59 of the punch 51 and the front end of the pusher 61.

The punch 51 is connected to an actuator (not illustrated) of the driving mechanism 13 and is driven thereby in a punching direction.

The fitting part 65 of the pusher 61 is connected to an actuator (not illustrated) of the driving mechanism 13. The pusher 61 is inserted in the punch 51 and is driven by the actuator independently of the punch 51 as illustrated in FIG. 3C.

The head suspension 71 illustrated in FIG. 4 will be explained.

In FIG. 4, the head suspension 71 has a base plate 75, a load bend 77, and a load beam 79. A flexure 81 is spot-welded to the load beam 79.

The load bend 77 may be made of a pair of legs that connect the base plate 75 and load beam 79 to each other.

The load beam 79 is made of a precision thin plate spring to apply load onto a slider (not illustrated). The load beam 79 may be a metal plate made of, for example, austenite-based stainless steel such as SUS304 and SUS305 according to Japanese Industrial Standard having a thickness of about several tens of micrometers to about one hundred micrometers.

The base plate 75 and load beam 79 may be integrated or separated. If they are separated, the load beam 79 is spot-welded to the base plate 75. The load bend 77 may be hinged to the load beam 79 and the load bend 77 may be spot-welded to the base plate 75.

The head suspension 71 illustrated in FIG. 4 is only an example to which the present invention is applicable. The present invention is applicable to any other head suspensions having different shapes or configurations. The present invention affixes a damper (73) to an objective part (for example, around a discontinuous section 72) on a head suspension, to effectively suppress vibration of the head suspension.

Figure 6:
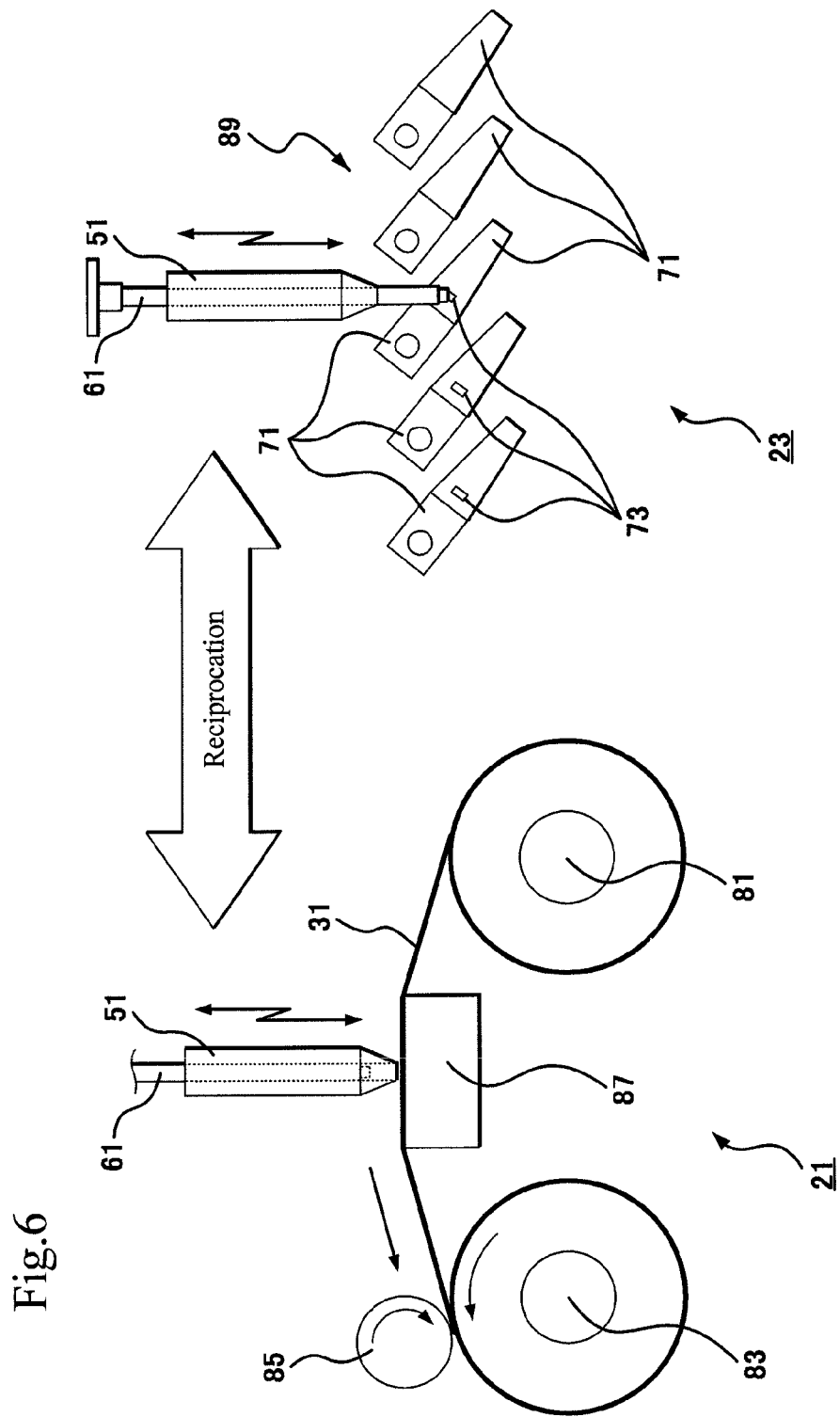
FIGS. 6 and 7 illustrate movements of a punch, pusher, and damper material according to an embodiment of the present invention.
Figure 7:
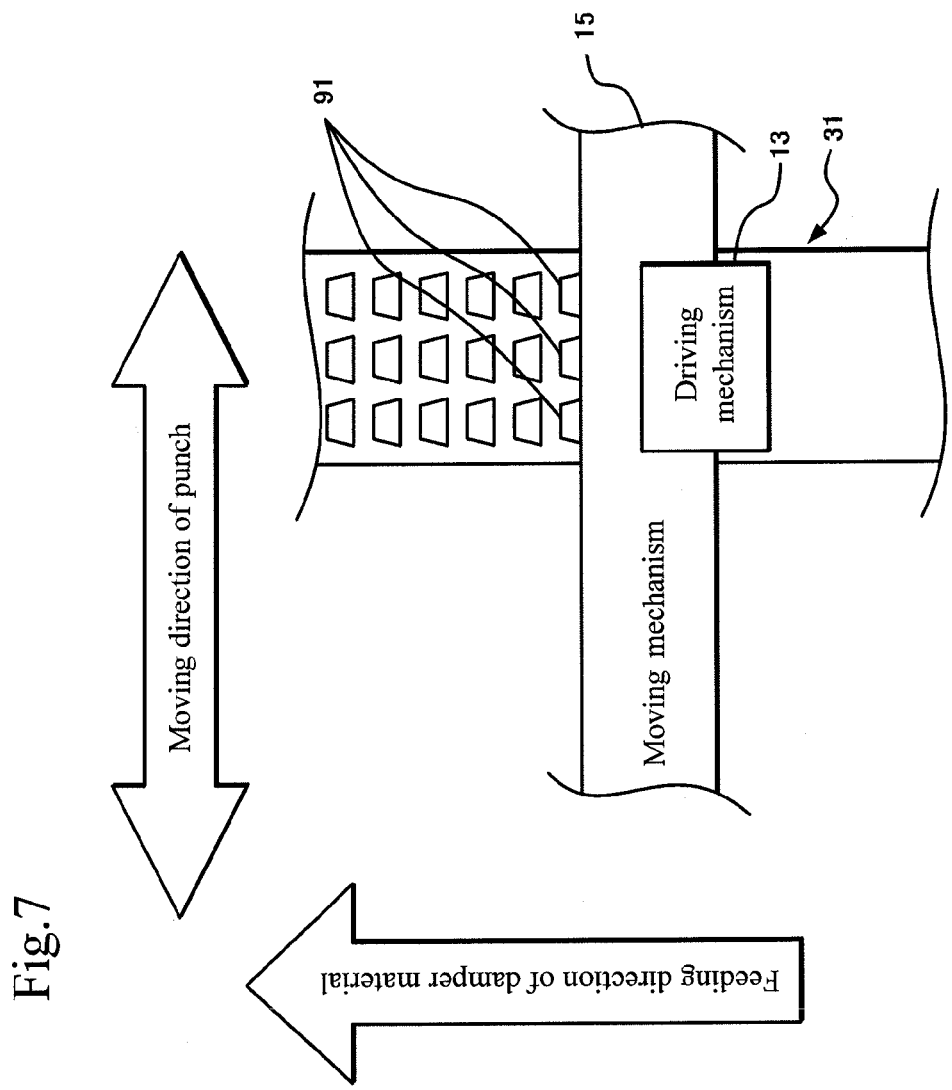

A method of manufacturing a head suspension according to an embodiment of the present invention will be explained with reference to FIGS. 5A to 7 in which FIGS. 5A to 5C sequentially illustrate the method and FIGS. 6 and 7 illustrate movements of the punch, pusher, and damper material according to the method of FIGS. 5A to 5C.

How the method of manufacturing a head suspension of the present invention was developed will be explained.

The inventors have studied to uniformize a vibration damping effect among head suspensions and improve the productivity of head suspensions. The inventors have found that manually affixing a damper to a head suspension during head suspension manufacturing processes vary the vibration damping effect among head suspensions and deteriorate the productivity of head suspensions. The inventors have concluded that manual work must be eliminated and manually affixing a damper to a head suspension must be automated.

As a consequence, the inventors have developed the apparatus 11 (FIG. 1) that punches a damper out of a damper material with a hollow punch, holds the damper with an inner face of the hollow punch, pushes the damper with a pusher out of the punch toward an objective part on a head suspension, and affixes the damper to the objective part. This apparatus automates the handling of dampers, simplifies the control of head suspension manufacturing, accurately positions each damper to an objective part on a head suspension, prevents small dampers from dispersing or being lost, and improves the productivity of head suspensions.

Figure 17A:
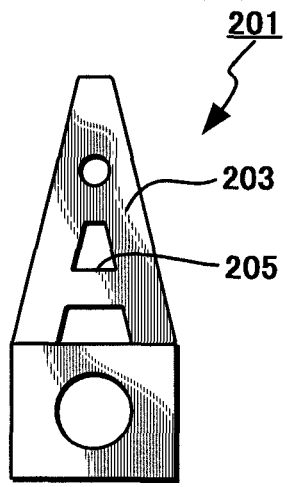
FIGS. 17A to 17D illustrate a head suspension before and after affixing a damper thereto according to a related art.

As illustrated in FIG. 17A, a head suspension usually has through holes and recesses to reduce the weight thereof and improve the vibration characteristic thereof. The head suspension 201 illustrated in FIG. 17A has a load beam 203 that includes a through hole (or a recess) 205 to reduce the weight of the head suspension 201 and improve the vibration characteristic thereof. Such a through hole or recess will be referred to as "discontinuous section" herein.

There is a requirement to attach a damper to an objective part of a head suspension that includes such a discontinuous section.

Figure 17B:
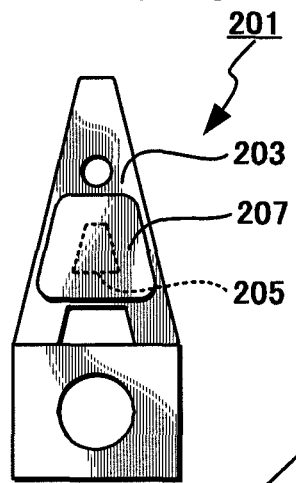
Figure 17C:
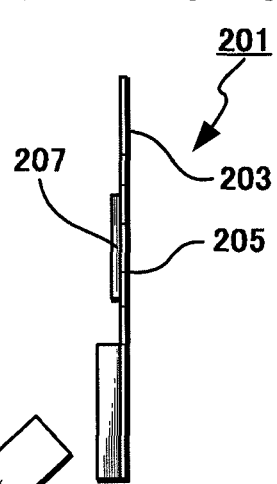

In FIG. 17B, a related art simply affixes a damper 207 to an objective part on the head suspension 201 that includes the discontinuous section 205. Simply affixing the damper 207 to the objective part without regard to the discontinuous section 205 results in exposing an adhesive face 209 of the damper 207 from the discontinuous section 205.

Figure 17D:
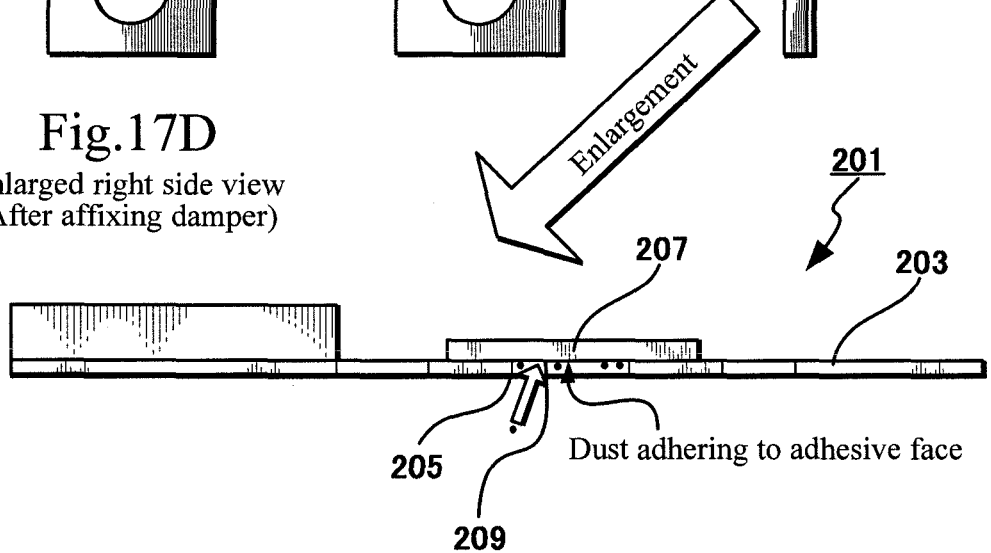

The exposed part of the adhesive face 209 attracts dust and the like as illustrated in FIG. 17D. The dust adhering to the exposed part of the adhesive face 209 or the exposed adhesive face 209 itself will drop on the surface of a disk in a disk drive to cause data write/read errors and functional troubles.

The part of the damper 207 corresponding to the discontinuous section 205 contributes nothing to a vibration damping effect. Namely, this part is a useless part that increases the weight of the head suspension 201 and deteriorates the performance of the head suspension 201.

When automating the process of affixing a damper to an objective part on a head suspension, one problem is that the objective part sometimes has a complicated shape such as an H-shape. In this case, a punch to punch the damper must have an edge of the complicated shape corresponding to the damper. When using such a punch of the complicated edge to punch a damper material, the edge will partly catch a viscoelastic layer of the damper material, to deteriorate the productivity of dampers.

To solve this and other problems mentioned above, the inventors have invented the present invention that affixes a damper having an adhesive face to an objective part of a head suspension containing a discontinuous section having a closed plane without varying a vibration damping effect among head suspensions or deteriorating the productivity, functionality, and performance of head suspensions.

Also, the present invention affixes a damper having a complicated shape to an objective part on a head suspension without varying a vibration damping effect among head suspensions or deteriorating the productivity of head suspensions.

A method of manufacturing a head suspension according to the present invention realizes a uniform vibration damping effect among produced head suspensions and improves the yield of dampers and head suspensions. The method punches a damper material 31 (FIG. 2) having a viscoelastic layer 33 and a retaining layer 35 into a damper 73 (FIG. 4) and affixes the damper 73 to an objective part on a half-finished product of a head suspension 71 (FIG. 4) having a base plate 75, a load beam 79, and a flexure 81, thereby completing the head suspension.

When the objective part on a head suspension to which a damper is affixed has a simple shape without a discontinuous section, the damper according to the present invention may be single and has a simple shape. If the objective part has a complicated shape with a discontinuous section, the damper according to the present invention may be divided into a plurality of damper segments each having a simple shape. When the damper is single, the damper is conceptually equal to a damper segment. When the damper consists of a plurality of damper segments, the damper conceptually differs from each damper segment.

The head suspension manufacturing method illustrated in FIGS. 5A to 5C according to an embodiment of the present invention downwardly drives the hollow punch 51 to punch the damper material 31 consisting of the retaining layer 35 and viscoelastic layer 33 into a damper 73 having a predetermined shape. The punched-out damper 73 is held by the inner face 59 of the hollow punch 51. This is a punching process illustrated in FIG. 5A and a left part of FIG. 6. The method upwardly drives the punch 51 with the damper 73 held therein and positions the punch 51 relative to an objective part on a head suspension. This is a positioning process illustrated in FIG. 5B and a right part of FIG. 6. At the position on the objective part of the head suspension, the method downwardly drives the punch 51, pushes the damper 73 with the pusher 61 out of the punch 51, and affixes the damper 73 to the objective part. This is an affixing process illustrated in FIG. 5C and the right part of FIG. 6.

The inner face 59 adjacent to the edge of the punch 51 is smoothed and the front end 67 of the pusher 61 is narrowed.

The damper material 31 may have a belt-like shape that is wound around a core. The damper material 31 is arranged on the punching stage 21 as illustrated in the left part of FIG. 6.

In FIG. 6, the damper material 31 wound around a core is set on a follower shaft 81 and an end of the damper material 31 is attached to a main shaft 83. The damper material 31 is passed between the main shaft 83 and a feed roller 85 by a predetermined distance at proper timing. Between the shafts 81 and 83, the damper material 31 is set on a punching table 87 where the damper material 31 is punched with the punch 51 containing the pusher 61, to form the damper 73.

The affixing stage 23 may be configured as illustrated in the right part of FIG. 6.

In FIG. 6, a plurality of head suspensions 71 are chained in series as a half product 89. The half product 89 is fixed to a work clamp (not illustrated) with a jig. Each damper 73 is affixed to an objective part on each head suspension 71 of the half product 89.

FIG. 7 illustrates positioning the punch 51 between the punching stage 21 and the affixing stage 23. In FIG. 7, the punch 51 is linearly moved by the moving mechanism 15 to an objective part on a head suspension 71 set on the affixing stage 23. The moving direction of the driving mechanism 13 on which the punch 51 is installed may be substantially orthogonal to the feeding direction of the damper material 31.

This configuration smoothly punches the belt-like damper material 31 into a plurality of dampers 73 in a widthwise direction of the damper material 31, thereby improving the yield of dampers 73. In FIG. 7, marks 91 represent punched holes formed on the damper material 31 after punching the dampers 73 out of the damper material 31.

As explained with reference to FIG. 17, the related art simply affixes the damper 207 over the objective part of the head suspension 201 including the discontinuous section 205 without regard to whether or not the objective part includes the discontinuous section 205. In this case, a part of the adhesive face 209 of the damper 207 corresponding to the discontinuous section 205 is exposed.

The exposed part of the adhesive face 209 attracts dust as illustrated in FIG. 17D. The dust adhering to the exposed part of the adhesive face 209 and the exposed adhesive face 209 itself will drop on the surface of a disk in a disk drive to cause data write/read errors and functional troubles.

The part of the damper 207 corresponding to the discontinuous section 205 contributes nothing to a vibration damping effect. Namely, this part is a useless part that increases the weight of the head suspension 201 and deteriorates the performance of the head suspension 201. There is a requirement, therefore, to remove the part corresponding to the discontinuous section from the damper 207 so as to reduce the weight of the head suspension 201 and improve the yield of dampers.

To meet the requirement, a method of manufacturing a head suspension, an apparatus for manufacturing a head suspension, and a head suspension are provided according to embodiments of the present invention.

In the following explanation, parts corresponding to those explained above will be represented with like reference marks and the same explanations will not be repeated.

Figure 9A:
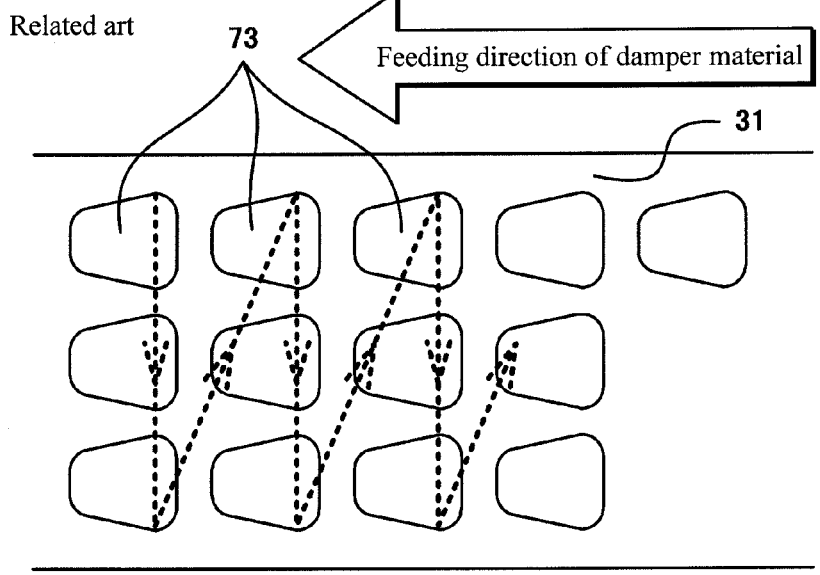
FIG. 9A illustrates punching a damper material into dampers according to a related art.
Figure 9B:
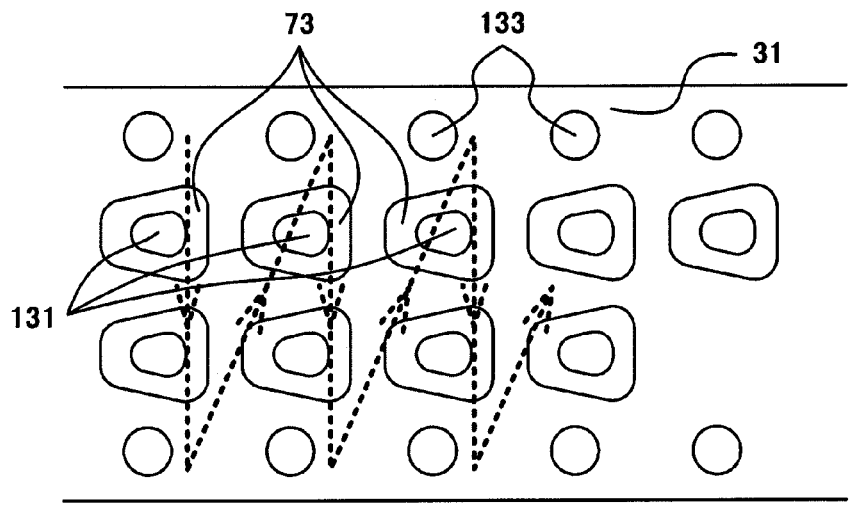
FIG. 9B illustrates punching a damper material into dampers according to Embodiment 1 of the present invention.
Figure 10A:
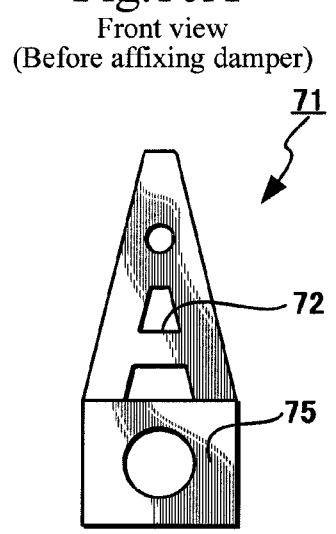
FIGS. 10A to 10C illustrate a head suspension before and after affixing a damper thereto according to Embodiment 1 of the present invention.
Figure 10B:
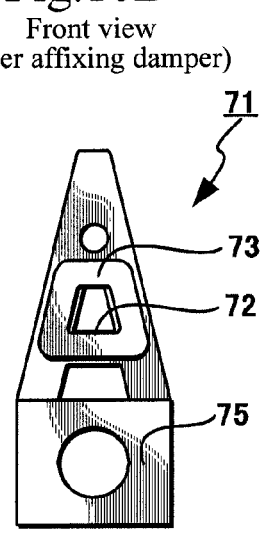
Figure 10C:
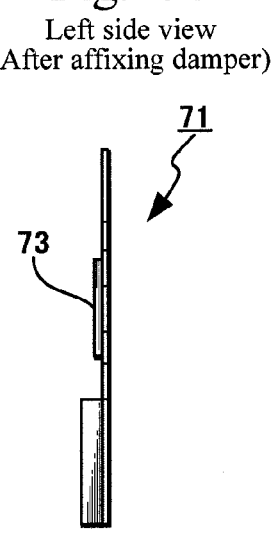
Figure 13A:
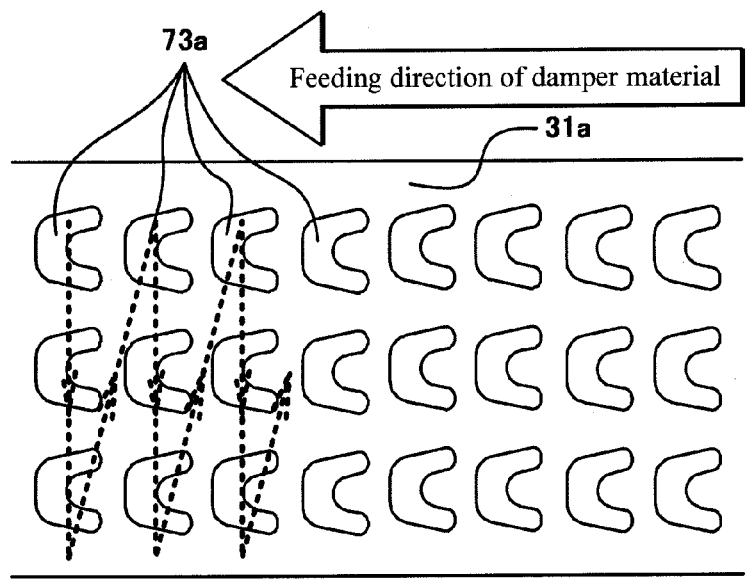
FIGS. 13A and 13B illustrate punching a damper material into damper segments according to Embodiment 2 of the present invention.
Figure 13B:
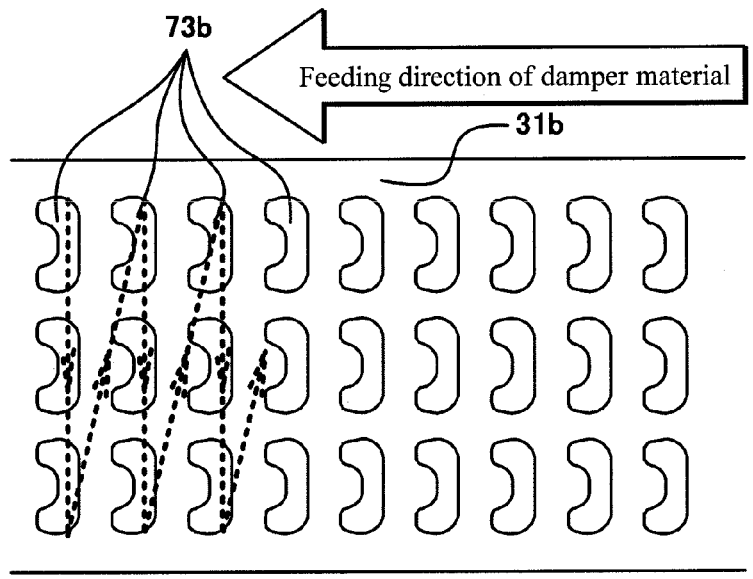
Figure 14A:
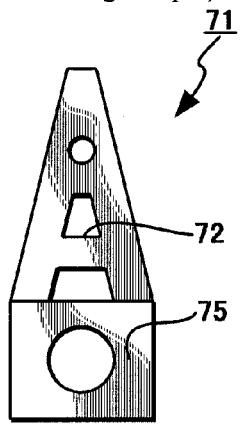
FIGS. 14A to 14C illustrate a head suspension before and after affixing damper segments thereto according to Embodiment 2-1-1 of the present invention.
Figure 14B:
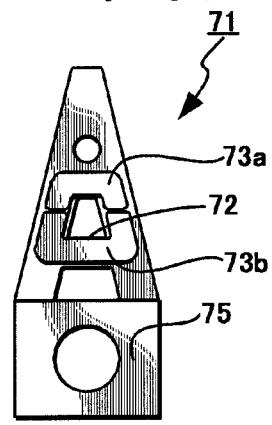
Figure 14C:
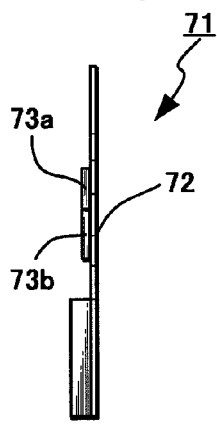
Figure 14D:
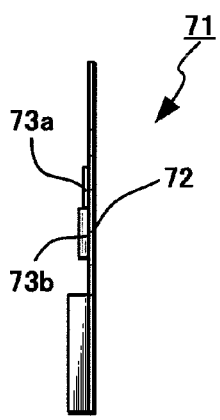
FIG. 14D illustrates a head suspension with damper segments according to Embodiment 2-1-2 of the present invention.
Figure 14E:
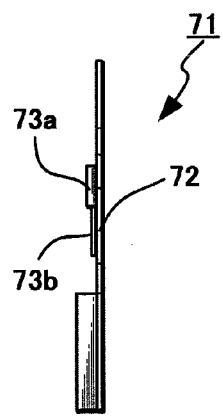
FIG. 14E illustrates a head suspension with damper segments according to Embodiment 2-1-3 of the present invention.
Figure 15A:
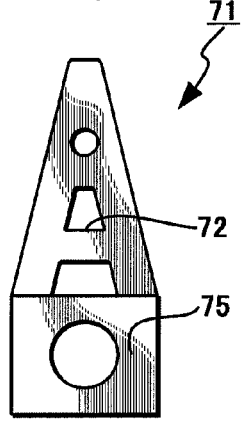
FIGS. 15A to 15C illustrate a head suspension before and after affixing damper segments thereto according to Embodiment 3-1 of the present invention.
Figure 15B:
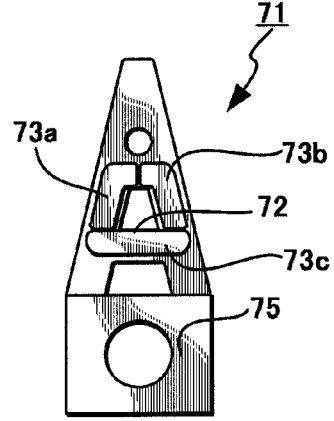
Figure 15C:
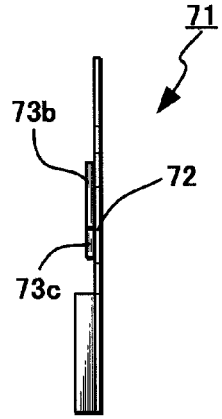
Figure 15D:
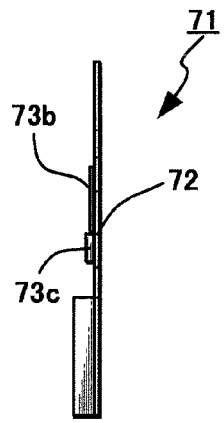
FIG. 15D illustrates a head suspension with damper segments according to Embodiment 3-2 of the present invention.
Figure 15E:
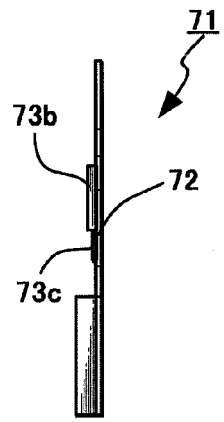
FIG. 15E illustrates a head suspension with damper segments according to Embodiment 3-3 of the present invention.
Figure 16A:
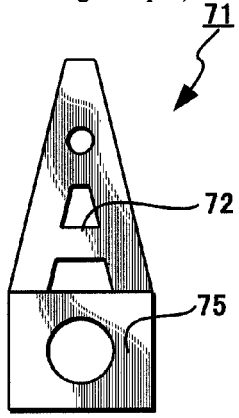
FIGS. 16A to 16C illustrate a head suspension before and after affixing damper segments thereto according to Embodiment 5 of the present invention.
Figure 16B:
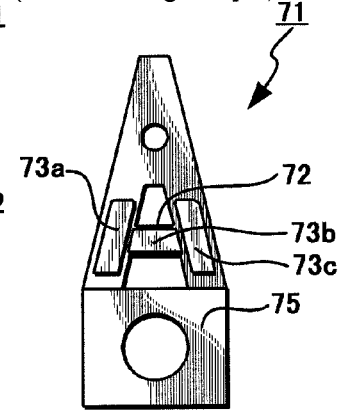
Figure 16C:
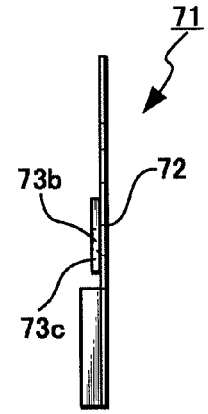

FIG. 8 is a block diagram illustrating an apparatus for manufacturing a head suspension according to an embodiment of the present invention, FIG. 9A illustrates punching a damper material into dampers according to a related art, FIG. 9B illustrates punching a damper material into dampers according to Embodiment 1 of the present invention, FIGS. 10A to 10C illustrate a head suspension before and after affixing a damper thereto according to Embodiment 1 of the present invention, FIG. 11A illustrates punching a damper material into damper segments according to Embodiment 2 of the present invention, FIG. 11B illustrates punching a damper material into damper segments according to Embodiment 4 of the present invention, FIGS. 12A to 12C illustrate a head suspension before and after affixing damper segments thereto according to Embodiment 2-1 of the present invention, FIGS. 12D to 12F illustrate a head suspension before and after affixing damper segments thereto according to Embodiment 2-2 of the present invention, FIGS. 13A and 13B illustrate punching a damper material into damper segments according to Embodiment 2 of the present invention, FIGS. 14A to 14C illustrate a head suspension before and after affixing damper segments thereto according to Embodiment 2-1-1 of the present invention, FIG. 14D illustrates a head suspension with damper segments according to Embodiment 2-1-2 of the present invention, FIG. 14E illustrates a head suspension with damper segments according to Embodiment 2-1-3 of the present invention, FIGS. 15A to 15C illustrate a head suspension before and after affixing damper segments thereto according to Embodiment 3-1 of the present invention, FIG. 15D illustrates a head suspension with damper segments according to Embodiment 3-2 of the present invention, FIG. 15E illustrates a head suspension with damper segments according to Embodiment 3-3 of the present invention, FIGS. 16A to 16C illustrate a head suspension before and after affixing damper segments thereto according to Embodiment 5 of the present invention, and FIGS. 17A to 17D illustrate the problems of a related art.

In FIGS. 8 and 10, the apparatus 100 for manufacturing a head suspension affixes a damper 73 having a one-stroke shape to an objective part on a half-finished head suspension 71, to thereby complete the head suspension 71. The objective part of the head suspension 71 includes a discontinuous section 72 such as a through hole or a recess having a closed shape.

The apparatus 100 includes a first block 101a, a second block 101b, and a controller 107. The first block 101a includes a driving mechanism 103a, a moving mechanism 105a, a punching stage 121a, and an affixing stage 123a. The second block 101b includes a driving mechanism 103b, a moving mechanism 105b, a punching stage 121b, and an affixing stage 123b.

The controller 107 is connected to the driving mechanisms 103a and 103b, the moving mechanisms 105a and 105b, and the like, to collectively control them.

The controller 107 controls the driving mechanisms 103a and 103b to punch damper segments with punches 51, the moving mechanisms 105a and 105b to position the punches 51 to objective parts on a head suspension, and the driving mechanisms 103a and 103b to push the damper segments with pushers 61 and affix the damper segments to the objective parts.

Between the punching stages 121a and 121b, a common damper material 31 may be fed. Between the affixing stages 123a and 123b, a common affixing line (not illustrated) may be fed. This, however, does not limit the present invention. For example, different damper materials 31 may be fed between the punching stages 121a and 121b.

The related art illustrated in FIG. 9A employs a single manufacturing block to punch and affix a damper 73 to a head suspension.

On the other hand, Embodiment 1 of the present invention illustrated in FIG. 9B first punches out a part 131 corresponding to a discontinuous section 72 (FIG. 10A) of a head suspension 71 from a damper material 31. The punched-out part 131 is discarded. Thereafter, Embodiment 1 punches the contour of a damper 73, so that the damper 73 is affixed around the discontinuous section 72 on the head suspension 71 as illustrated in FIG. 10B.

In FIGS. 9A and 9B and other drawings, dotted arrows indicate a sequence of punching a damper material 31 into dampers 73. In FIG. 9B, a reference numeral 133 indicates a pilot hole used to position and feed the belt-like damper material 31.

To process the dampers 73 illustrated in FIG. 9B, the manufacturing blocks 101a and 101b are used. One of the manufacturing blocks, for example the block 101a, is used to punch out the part 131 corresponding to the discontinuous section 72 of the head suspension 71 and the other block 101b is used to punch the contour of the damper 73.

A necessary number of such manufacturing blocks may be arranged for each of different dampers.

Embodiment 1 illustrated in FIGS. 9B and 10A to 10C conducts a punching process that punches out the part 131 corresponding to the discontinuous section 72 of the head suspension 71 and forms the damper 73 substantially having an annular shape, a positioning process that positions the damper 73 to surround the discontinuous section 72 in an objective part on the head suspension 71, and an affixing process that affixes the damper 73 to the objective part so that the damper 73 surrounds the discontinuous section 72.

According to Embodiment 1, an adhesive face of the damper 73 entirely adheres to the periphery of the discontinuous section 72 of the head suspension 71 and there is no adhesive face that is exposed, as illustrated in FIG. 10B. This prevents the functional and performance deterioration of the head suspension 71.

A damper attached to an objective part including a discontinuous section on a head suspension may be required to have a one-stroke contour.

In FIGS. 9B and 10B, the damper 73 does not have a one-stroke contour because the damper 73 has an annular shape composed of two contours, i.e., an outer annular contour and an inner annular contour. In this case, the damper 73 must be formed in two steps, one punching out the part 131 and the other forming the outer contour of the damper 73. These two steps must positionally be adjusted with each other. Such a positioning adjustment between the two steps restricts the degree of freedom in designing a head suspension and a damper for the head suspension.

This restriction will be removed by Embodiment 2 illustrated in FIGS. 11A to 13B. Embodiment 2 carries out a punching process that punches damper segments 73a and 73b each having a one-stroke contour to form a damper surrounding the discontinuous section 72 of the head suspension 71, a positioning process that positions the damper segments 73a and 73b to surround the discontinuous section 72, and an affixing process that affixes the damper segments 73a and 73b around the discontinuous section 72.

Embodiment 2-1 illustrated in FIGS. 12A to 12C prepares horizontally-divided damper segments 73a and 73b and Embodiment 2-2 illustrated in FIGS. 12D to 12F prepares vertically-divided damper segments 73a and 73b. The damper segments 73a and 73b of each of Embodiments 2-1 and 2-2 are formed to have the same thickness from common damper materials 31.

Embodiment 2 employs the manufacturing blocks 101a and 101b illustrated in FIG. 8. One of the manufacturing blocks, for example, the manufacturing block 101a punches, positions, and affixes the damper segment 73a and the other manufacturing block 101b punches, positions, and affixes the damper segment 73b.

Between the punching stages 121a and 121b, a common damper material 31 is fed, and between the affixing stages 123a and 123b, a common affixing line is fed.

According to Embodiment 2, a damper affixed to an objective part on a head suspension including a discontinuous section is divided into damper segments 73a and 73b each having a one-stroke contour.

Embodiment 2 prevents the functional and performance deterioration of the head suspension, thereby securing the degree of freedom in designing the head suspension.

Each of the damper segments 73a and 73b has a simple one-stroke contour, and therefore, is easily punched out with a punch 51 without the viscoelastic layer 33 of the damper material 31 being caught by the edge 57 of the punch 51. This improves the yield of dampers and head suspensions.

When affixing the damper segments 73a and 73b to an objective part on a head suspension, there is no need of positioning the damper segments 73a and 73b relative to each other. This eliminates the need of pilot pins for positioning and simplifies the manufacturing processes of head suspensions.

When affixing damper segments to an objective part on a head suspension including a discontinuous section, there may be a need of precisely setting a damping effect. There is a correlation between an area where the damper segments are affixed and a vibration damping effect provided by the damper segments.

To precisely set and maintain a vibration damping effect on a head suspension, a proper area to affix damper segments must be secured on the head suspension.

For this, Embodiment 2-1-1 illustrated in FIGS. 13A, 13B, and 14A to 14C punches different damper materials 31 into damper segments 73a and 73b and Embodiments 2-1-2 and 2-1-3 illustrated in FIGS. 13A, 13B, 14D, and 14E punch different or common damper materials into damper segments 73a and 73b having different thicknesses.

In FIGS. 13A and 13B, damper materials 31a and 31b are made of different materials or have different thicknesses and are fed between the punching stages 121a and 121b. At this time, a common affixing line is fed between the affixing stages 123a and 123b.

According to Embodiments 2-1-1 to 2-1-3 illustrated in FIGS. 14A to 14E, damper segments 73a and 73b are punched out of different damper materials 31, or different or the same damper materials 31 having different thicknesses.

These damper segments 73a and 73b secure the same area as the damper 73 of Embodiment 1 secures and precisely set a vibration damping effect through a proper combination of materials and thicknesses.

These damper segments prevent the functional and performance deterioration of a head suspension, secure the degree of freedom in designing a head suspension, and precisely set a vibration damping effect.

In this way, Embodiment 2 divides a damper 73 into damper segments 73a and 73b each having a one-stroke contour to surround a discontinuous section in an objective part on a head suspension.

A damper 73 may be divided into three or more damper segments 73a, 73b, and 73c each having a one-stroke contour and avoiding and surrounding a discontinuous section contained in an objective part on a head suspension to which the damper 73 is affixed. Examples of this are Embodiments 3-1, 3-2, and 3-3 illustrated in FIGS. 15A to 15E.

In this case, the damper segments 73a, 73b, and 73c may be formed from the same damper material or from different damper materials. Among the three or more damper segments, a pair of damper segments may have different thicknesses without regard to whether they are made of the same material or different materials.

Like Embodiment 2, Embodiments 3-1 to 3-3 prevent the functional and performance deterioration of a head suspension, secure the degree of freedom in designing a head suspension, and precisely set a vibration damping effect.

When punching dampers 73 out of a belt-like damper material 31, it is necessary to increase the yield of dampers. For this, Embodiment 4 of the present invention illustrated in FIG. 11B punches a belt-like damper material 31 into damper segments 73a and 73b in nested patterns.

According to Embodiment 4, each pair of damper segments 73a and 73b are punched from a belt-like damper material 31 in nested patterns as illustrated in FIG. 11B, to improve the yield of damper segments and the productivity of head suspensions.

There is a requirement to form a damper having a complicated shape such as an H-shape and affix the damper to an objective part on a head suspension. To meet the requirement, a punch having a complicated shape corresponding to the shape of the damper may be used. The punch having such a complicated shape, however, will catch the viscoelastic layer 33 of the damper material 31 with an edge of the punch, to deteriorate the productivity of dampers.

To solve this problem, there is provided Embodiment 5 of the present invention illustrated in FIGS. 16A to 16C. Embodiment 5 carries out a punching process that punches damper segments 73a, 73b, and 73c, a positioning process that positions the damper segments 73a, 73b, and 73c to form a predetermined shape (an H-shape in FIG. 16B) on an objective part of a head suspension, and an affixing process that affixes the damper segments 73a, 73b, and 73c to the objective part.

Embodiment 5 simplifies the handling and driving control of the damper segments 73a, 73b, and 73c and precisely positions and affixes the damper segments to an objective part on a head suspension. Embodiment 5 prevents small damper segments from dispersing or being lost, to thereby improve the productivity of damper segments and head suspensions.

To meat the requirement for a damper having a complicated shape such as an H-shape, Embodiment 5 divides the complicated damper into simple damper segments each having a one-stroke contour.

As a result, a damper material 31 can smoothly be punched with a punch 51 into a damper segment without a viscoelastic layer 33 of the damper material 31 being caught by an edge of the punch 51. This results in improving the productivity of damper segments and head suspensions.

To manufacture a head suspension, Embodiment 5 carries out the punching process that punches a damper material 31 having an adhesive face covered with a removable liner with a hollow punch 51 into a damper segment (73a, 73b, 73c) and holds the damper segment by a hollow inner face of the punch 51, the positioning process that positions the punch 51 holding the damper segment relative to an objective part on a head suspension including a discontinuous section, and the affixing process that pushes the damper segment with a pusher 61 out of the punch 51 and affixes an adhesive face of the damper segment to the objective part along the discontinuous section.

The damper segments 73a, 73b, and 73c may be punched out of a common damper material 31. Alternatively, the damper segments 73a, 73b, and 73c may be punched out of different damper materials 31. At least a pair of damper segments among the damper segments 73a, 73b, and 73c may have different thicknesses.

The damper segments 73a, 73b, and 73c may be punched out of a belt-like damper material(s) 31. In this case, the damper segments may be punched out of the belt-like damper material(s) in nested patterns to improve the yield of damper segments. For this, the controller 107 may have a program for arranging damper segments in nested patterns on a damper material, and according to the program, may carry out the punching process.

According to the present invention, an object whose vibration damping characteristic is controlled by affixing a damper thereto is a head suspension. Not only the vibration damping characteristics of head suspensions but also those of other devices are controllable according to the present invention by affixing dampers thereto.

In this respect, an embodiment of the present invention provides a method of affixing a damper to an object (for example, a half-finished head suspension) whose vibration damping characteristic must be controlled. This method will be explained with the use of FIGS. 12A to 12C of Embodiment 2-1. The method affixes a damper 73 to an objective part on the object 71 in such a way as to surround a discontinuous section 72 that is in the objective part and has a closed planar shape. The method divides the damper 73 into a plurality of damper segments (73a, 73b) and separately affixes the damper segments to the objective part so as to surround the discontinuous section 72.

An adhesive face of each of the damper segments is entirely affixed to the periphery of the discontinuous section 72, so that no adhesive face of the damper segments is exposed. This prevents dust from adhering and depositing around the discontinuous section 72.

The damper segments may be formed from different damper materials or may have different thicknesses, to adjust a vibration damping effect provided by the damper segments.

The method of affixing a damper to an object includes a punching process of punching a damper material 31 having an adhesive face covered with a removable liner with a hollow punch 51 into a damper segment (73a, 73b) and holding the damper segment by a hollow inner face of the punch 51, a positioning process of positioning the punch 51 holding the damper segment to an objective part on the object including a discontinuous section 72, and an affixing process of pushing the damper segment with a pusher 61 out of the punch 51 and affixing an adhesive face of the damper segment to the objective part along the discontinuous section 72.

The damper segments may be punched out from a common damper material 31, or they may be punched out from different damper materials 31. At least a pair of damper segments among the damper segments may have different thicknesses.

The damper segments may be punched out from a belt-like damper material(s) 31. In this case, the damper segments may be punched in nested patterns to improve the yield of damper segments. The nested patterns are selected to maximize the yield of damper segments. For this, the controller 107 may have a program for arranging damper segments in nested patterns on a damper material, and according to the program, may carry out the punching process.

As explained above, the method of manufacturing a head suspension according to any one of the embodiments of the present invention punches a damper material 31 with a punch 51 into a damper 73, holds the damper 73 by an inner face 59 of the punch 51, pushes the damper 73 with a pusher 61 out of the punch 51, and affixes the damper 73 to an objective part on the head suspension.

Unlike the related art that arranges punched-out dampers 73 on a liner, picks up the dampers 73 one by one, and affixes the damper 73 to an objective part on a head suspension, the present invention reduces the number of damper handling processes, simplifies driving control related to dampers, and precisely positions each damper relative to an objective part. The present invention prevents dampers from dispersing or being lost, to thereby improve the productivity of dampers and head suspensions.

According to the present invention, the inner face 59 of the punch 51 around the edge 55 thereof is polished and smoothed, to smoothly punch out a damper and smoothly push the damper out of the punch 51.

According to the present invention, the front end of the pusher 61 has the narrowed part 67. When the pusher 61 pushes a damper out of the inner face 59 of the punch 51, the narrowed part 67 of the pusher 61 provides a space between the inner face 59 of the punch 51 and the pusher 61. This prevents a viscoelastic layer of the damper from being caught by the edge 57 of the punch 51, to thereby smoothly push the damper out of the punch 51.

According to the present invention, the punch 51 is positioned relative to an objective part on a head suspension by linearly moving the punch 51 with the moving mechanism 15. The moving direction of the punch 51 arranged on the driving mechanism 13 is substantially orthogonal to a feeding direction of a belt-like damper material 31. This configuration improves the yield of dampers when punching dampers out of the damper material 31 in a widthwise direction.

According to the present invention, the punch 51 is used as a manufacturing jig to punch a damper material 31 into a damper so that the damper is held by the hollow inner face 59 of the punch 51. The pusher 61 is used as a jig to push the damper out of the punch 51 and directly affix the damper to an objective part on a head suspension. These jigs are optimum for automating the process of affixing dampers to head suspensions.

Head suspensions manufactured according to the present invention have a uniform vibration damping effect among them, and therefore, are capable of correctly reading and writing data.

The apparatus 11 according to the present invention for manufacturing a head suspension employs the punch 51 to punch a damper material 31 into a damper, holds the damper by the hollow inner face 59 of the punch 51, pushes the damper with the pusher 61 out of the punch 51, and affixes the damper to an objective part on a head suspension.

Unlike the related art that arranges dampers on a liner, picks up the dampers one by one, and affixes the damper to an objective part on a head suspension, the present invention reduces the number of damper handling processes, simplifies driving control related to dampers, and precisely positions each damper relative to an objective part. The present invention prevents dampers from dispersing or being lost, to thereby improve the productivity of dampers and head suspensions.

According to Embodiment 1 of the present invention, an adhesive face of a damper is entirely affixed to the periphery of a discontinuous section of an objective part on a head suspension, so that no adhesive face of the damper is exposed. This prevents the functional and performance deterioration of the head suspension.

According to Embodiment 2 (2-1, 2-2, 2-1-1, 2-1-2, 2-1-3) of the present invention, a damper or a damper segment to be affixed to an objective part containing a discontinuous section on a head suspension has a one-stroke contour. This prevents the functional and performance deterioration of the head suspension and secures the degree of freedom in designing head suspensions.

Embodiment 2 (2-1, 2-2, 2-1-1, 2-1-2, 2-1-3) of the present invention not only prevents the functional and performance deterioration of the head suspension and secures the degree of freedom in designing head suspensions but also allows to precisely adjust and secure a vibration dumping effect.

Embodiment 3 (3-1, 3-2, 3-3) of the present invention prevents the functional and performance deterioration of a head suspension and secures the degree of freedom in designing head suspensions like Embodiment 2 (2-1, 2-2, 2-1-1, 2-1-2, 2-1-3). In addition, Embodiment 3 (3-1, 3-2, 3-3) can precisely adjust and secure a vibration dumping effect.

Embodiment 4 of the present invention punches damper segments in nested patterns out of a belt-like damper material, to improve the productivity of dampers and head suspensions.

Embodiment 5 of the present invention punches damper segments through a reduced number of processes and simple driving control and precisely positions and affixes the damper segments to an objective part on a head suspension. Embodiment 5 prevents small damper segments from dispersing or being lost. When punching a damper segment out of a damper material, Embodiment 5 prevents the edge 57 of the punch 51 from catching a viscoelastic layer of the damper material, thereby improving the productivity of damper segments and head suspensions.

The present invention is not limited to the above-mentioned embodiments. Various modifications will be possible based on the embodiments or teachings provided in Claims and Specification without departing from the scope of the present invention. Methods and apparatuses for manufacturing head suspensions and head suspensions themselves based on such modifications also fall in the scope of the present invention.

For example, the shape of a damper attached to an objective part of a head suspension is not limited to a chamfered trapezoid. Dampers of optional shapes are adoptable according to the present invention if the dampers are appropriate for securing the vibration damping effect of head suspensions.

Also, the edge 57 of the punch 51 may have an optional shape with a one-stroke contour instead of the chamfered trapezoid illustrated in FIG. 3A.

Similarly, the pusher 61 may have an optional shape with a one-stroke contour instead of the chamfered trapezoid illustrated in FIG. 3B.

What is claimed is:

1. A head suspension for supporting a slider, comprising:
    a base plate, a load beam and a load bend connecting the base plate and the load beam, thereby to apply a load onto a slider through the load beam;
    an objective part defined on a surface of the load beam of the head suspension; and
    a damper punched out from a damper material that has an adhesive face covered with a removable liner, the damper positioned relative to the objective part and affixed to the objective part with the adhesive face;
    wherein the objective part on the load beam includes a discontinuous section that is present on the surface of the load beam of the head suspension and has a closed planar shape;
    wherein the damper has an exposed top face opposite to the adhesive face and is affixed to the objective part with the adhesive face, wherein the damper is a band having an annular planar shape with a cutout corresponding to the discontinuous section in the objective part, the annular planar shape of the damper that corresponds to the shape of the objective part excluding the discontinuous section so that an inner periphery and an outer periphery of the damper are annular to follow an edge of the discontinuous section having a closed annular planar shape and to encircle the discontinuous section, whereby the damper encircles the discontinuous section;
    wherein the damper is divided into plural damper segments in a direction along which the damper encircles the discontinuous section; and
    wherein the plural damper segments include at least a first damper segment and a second damper segment that are made of different materials, the first and second damper segments being used in combination with each other and being affixed to the objective part together to encircle the discontinuous section.

2. The head suspension of claim 1, wherein the load beam is a single thin plate spring layer that has one or more discontinuous cutout sections, and wherein the damper is on a limited portion of the surface of the load beam, has an exposed surface and encircles a single discontinuous cutout section.

3. The head suspension of claim 1, wherein the damper material comprises a viscoelastic layer and a retaining layer.

4. A head suspension for supporting a slider, comprising:
    a base plate, a load beam and a load bend connecting the base plate and the load beam, thereby to apply a load onto a slider through the load beam;
    an objective part defined on a surface of the load beam of the head suspension; and
    a damper punched out from a damper material that has an adhesive face covered with a removable liner, the damper positioned relative to the objective part and affixed to the objective part with the adhesive face; and
    wherein the objective part on the load beam includes a discontinuous section that is present on the surface of the load beam of the head suspension and has a closed planar shape;
    wherein the damper has an exposed top face opposite to the adhesive face and is affixed to the objective part with the adhesive face, wherein the damper is a band having an annular planar shape with a cutout corresponding to the discontinuous section in the objective part, the annular planar shape of the damper that corresponds to the shape of the objective part excluding the discontinuous section so that an inner periphery and an outer periphery of the damper are annular to follow an edge of the discontinuous section having a closed annular planar shape and to encircle the discontinuous section, whereby the damper encircles the discontinuous section;
    wherein the damper is divided into plural damper segments in a direction along which the damper encircles the discontinuous section; and
    wherein the plural damper segments include a least a first damper segment and a second damper segment that have different thickness, the first and second damper segments being used in combination with each other and being affixed to the objective part together to encircle the discontinuous section.

* * * * *

UNITED STATES PATENT AND TRADEMARK OFFICE
CERTIFICATE OF CORRECTION

Page 1 of 1

PATENT NO. : 9,082,437 B2
APPLICATION NO. : 13/494394
DATED : July 14, 2015
INVENTOR(S) : Umebayashi et al.

It is certified that error appears in the above-identified patent and that said Letters Patent is hereby corrected as shown below:

In the claims

Claim 4, Column 6, line 39, delete

"wherein the plural damper segments include a least a first"

insert

--wherein the plural damper segments include at least a first--

Signed and Sealed this
First Day of December, 2015

Michelle K. Lee
*Director of the United States Patent and Trademark Office*